(12) United States Patent
Guo et al.

(10) Patent No.: US 10,040,915 B2
(45) Date of Patent: *Aug. 7, 2018

(54) MULTI-STAGE POLYMER COMPOSITION AND FILMS MADE THEREFROM

(71) Applicant: Rohm and Haas Company, Philadelphia, PA (US)

(72) Inventors: Hailan Guo, Warrington, PA (US); Steven J. Broadwater, Warminster, PA (US); Veera D. Nelliappan, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/418,521

(22) PCT Filed: Aug. 5, 2013

(86) PCT No.: PCT/US2013/053544
§ 371 (c)(1),
(2) Date: Jan. 30, 2015

(87) PCT Pub. No.: WO2014/035608

PCT Pub. Date: Mar. 6, 2014

(65) Prior Publication Data

US 2015/0183944 A1  Jul. 2, 2015

Related U.S. Application Data

(60) Provisional application No. 61/694,340, filed on Aug. 29, 2012.

(51) Int. Cl.
| | |
|---|---|
| *C08J 5/18* | (2006.01) |
| *C08F 220/10* | (2006.01) |
| *C08F 265/06* | (2006.01) |
| *C08F 285/00* | (2006.01) |
| *C08F 220/40* | (2006.01) |

(52) U.S. Cl.
CPC ............... *C08J 5/18* (2013.01); *C08F 220/10* (2013.01); *C08F 220/40* (2013.01);
(Continued)

(58) Field of Classification Search
None
See application file for complete search history.

(56) References Cited

U.S. PATENT DOCUMENTS

| | | | | |
|---|---|---|---|---|
| 4,513,118 A | * | 4/1985 | Suetterlin | C08F 285/00 525/304 |
| 5,756,573 A | * | 5/1998 | Trumbo | C08F 285/00 524/458 |
| 2006/0011617 A1 | | 1/2006 | Covarrubias et al. | |

FOREIGN PATENT DOCUMENTS

| | | |
|---|---|---|
| EP | 0989144 | 3/2000 |
| EP | 1582538 | 10/2005 |

(Continued)

OTHER PUBLICATIONS

International Preliminary Report on Patentability (IPRP), dated Mar. 12, 2015; from counterpart PCT Application No. PCT/US2013/053544.

(Continued)

*Primary Examiner* — Tahseen N Khan

(57) ABSTRACT

A multi-stage polymer composition comprising a cross-linked core having a Tg of from −85 to −10° C.; an intermediate region which comprises one or more intermediate layers, wherein each of the intermediate layers comprises from 88.5 to 99.9 weight percent of units derived from a one or more monomers selected from the group consisting of alkyl (meth)acrylate monomers, from 0 to 5 weight percent of units derived from a cross-linking monomer, a graft-linking monomer, or a combination of two or more thereof, optionally from 0 to 2 weight percent units derived from one or more chain transfer agents; wherein there is a (Continued)

compositional gradient between the intermediate layers such that the Tg transitions from −30° C. to 70° C. over the width of the intermediate region, and an outermost layer which has a Tg of from 40° C. to 110° C. is provided.

16 Claims, 1 Drawing Sheet

(52) U.S. Cl.
CPC .......... *C08F 265/06* (2013.01); *C08F 285/00* (2013.01); *C08J 2333/06* (2013.01); *C08J 2333/08* (2013.01); *C08J 2433/12* (2013.01); *C08J 2435/02* (2013.01)

(56) References Cited

FOREIGN PATENT DOCUMENTS

| | | | |
|---|---|---|---|
| EP | 1582538 a1 | * | 10/2005 |
| JP | S57151365 | | 9/1982 |
| JP | 2000-319479 | | 11/2000 |
| JP | 2004002665 | | 1/2004 |
| JP | 2006-124640 | | 5/2006 |
| JP | 2011-153291 | | 8/2011 |

OTHER PUBLICATIONS

Search Report dated Oct. 16, 2013; from counterpart PCT Application No. PCT/US2013/053544.
EP Office Action dated Feb. 11, 2015; from EP counterpart Application No. 13747628.9.
EP Office Action dated Mar. 31, 2016; from EP counterpart Application No. 13747628.9.
Chinese Office Action dated Aug. 22, 2016; from Chinese counterpart Application No. 201380043275.7.
Chinese Office Action dated Aug. 24, 2017; from Chinese counterpart Application No. 201380043275.7.
Japanese Office Action dated May 1, 2017; from Japanese counterpart Application No. 2015-529825.
BASF "Allyi Methacrylate (AMA)", Technical Information, Petrochemicals Specialty Monomers, TI/ED 2059 e, Dec. 2011, pp. 1-3.

* cited by examiner

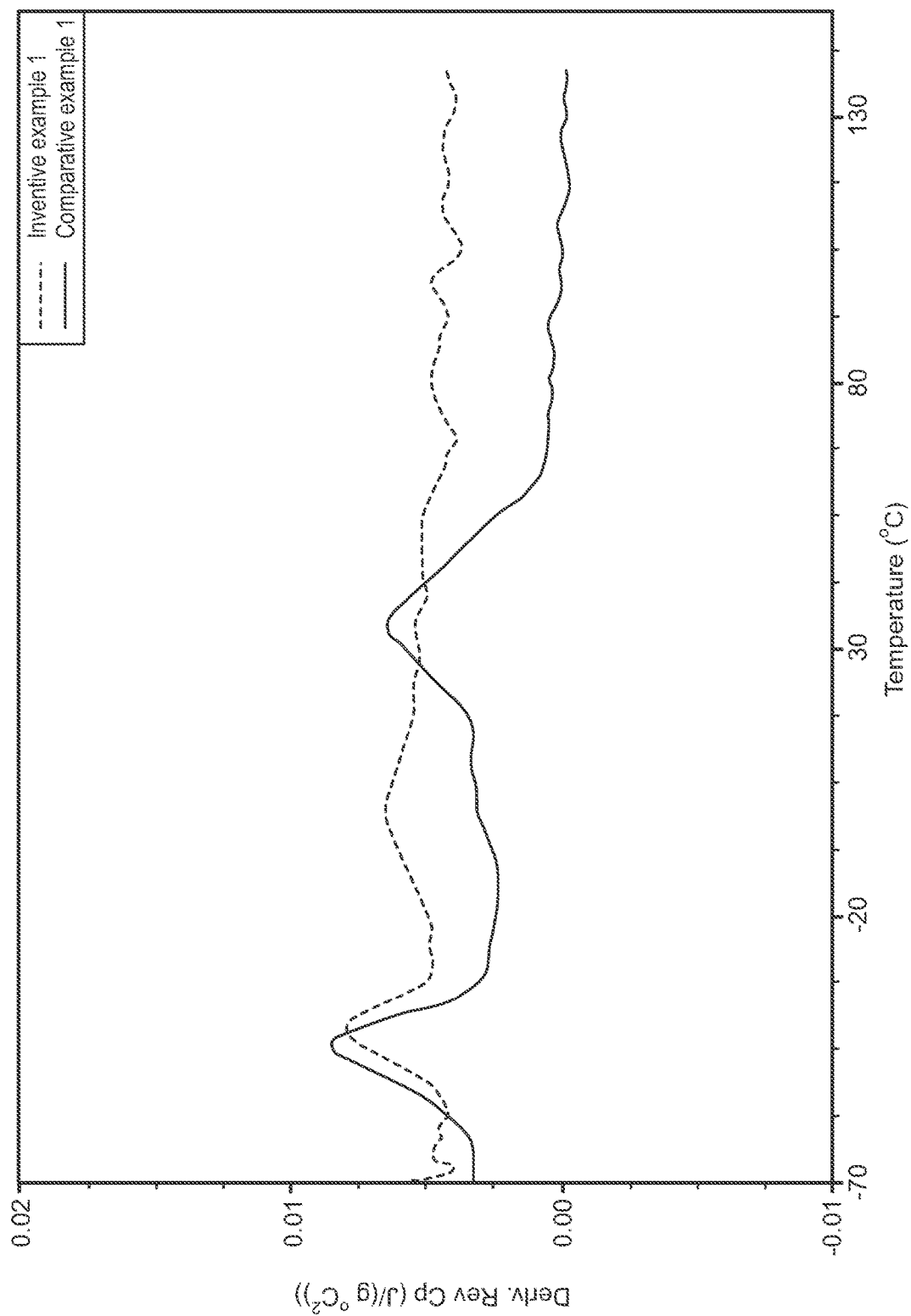

MULTI-STAGE POLYMER COMPOSITION AND FILMS MADE THEREFROM

FIELD OF INVENTION

The instant invention relates to a multi-stage polymer composition and films made therefrom.

BACKGROUND OF THE INVENTION

A variety of indoor and outdoor products require flexible, transparent, and weather resistant plastic resins and films. Existing commercial resins comprising fluorine-containing polymers or aliphatic thermoplastic polyurethane (TPU) deliver the performance required by such indoor and outdoor products. However such resins are prohibitively expensive for the majority of end uses. Low cost alternative resins are available, such as polyvinylchloride (PVC) resins containing plasticizer and polyethylene resins. However, such resins also present drawbacks, such as failure to meet all of the performance requirements and/or undesirable environmental impact.

Acrylic films made from existing resins manufactured via free radical polymerization process are generally too rigid for certain end use applications, possess high moduli and poor tear resistance. One commercial acrylic resin currently available contains block copolymers of polymethylmethacrylate (PMMA) and polybutylacrylate (PBA) and is produced by an anionic polymerization process. Such commercial resins possess excellent flexibility and whitening resistance. However, the method of producing this resin is very expensive, resulting in a resin cost which is prohibitive for many applications.

SUMMARY OF THE INVENTION

The instant invention is a multi-stage polymer composition and films made therefrom.

In one embodiment, the instant invention provides a multi-stage polymer composition comprising: a crosslinked core which comprises greater than 95 weight percent of units derived from one or more monomers selected from the group consisting of alkyl(meth)acrylate monomers, from 0.1 to 5 weight percent of units derived from a cross-linking monomer, graft-linking monomer, or combination thereof, and wherein the crosslinked core has a Tg of from −85 to −10° C.; an intermediate region which comprises one or more intermediate layers, wherein each of the intermediate layers comprises from 93 to 100 weight percent of units derived from a one or more monomers selected from the group consisting of alkyl(meth)acrylate monomers, from 0 to 5 weight percent of units derived from a cross-linking monomer, a graft-linking monomer, or a combination thereof, optionally from 0 to 2.0 weight percent units derived from one or more chain transfer agents; wherein there is a compositional gradient between the intermediate layers such that the Tg transitions from −30° C. to 70° C. over the width of the intermediate region, and an outermost layer which comprises from 98.5 to 100 weight percent units derived from one or more monomers selected from the group consisting of alkyl(meth)acrylate, styrenic monomers, and combinations, from 0 to 1.5 weight percent units derived from one or more chain transfer agents, and has a Tg of from 40° C. to 110° C.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

FIG. 1 is a graph of the heat capacity measured by DSC, for Inventive Example 1 and Comparative Example 1.

DETAILED DESCRIPTION OF THE INVENTION

The instant invention is a multi-stage polymer composition and films made therefrom.

As used herein, the term "(meth)acrylate" means acrylate or methacrylate.

The multi-stage polymer composition according to the present invention comprises: a crosslinked core which comprises greater than 95 to 99.9 weight percent of units derived from one or more monomers selected from the group consisting of alkyl(meth)acrylate monomers, from 0.1 to 5 weight percent of units derived from a cross-linking monomer, graft-linking monomer, or combination of two or more thereof, and wherein the crosslinked core has a Tg of from −85 to −10° C.; an intermediate region which comprises one or more intermediate layers, wherein each of the intermediate layers comprises up to 100 weight percent of units derived from a one or more monomers selected from the group consisting of alkyl(meth)acrylate monomers, from 0 to 5 weight percent of units derived from a cross-linking monomer, a graft-linking monomer, or a combination of two or more thereof, optionally from 0 to 2.0 weight percent units derived from one or more chain transfer agents; wherein there is a compositional gradient between the intermediate layers such that the Tg transitions from −30° C. to 70° C. over the width of the intermediate region, and an outermost layer which comprises from 98.5 to 100 weight percent units derived from one or more monomers selected from the group consisting of alkyl(meth)acrylate, styrenic monomers, and combinations of two or more thereof, from 0 to 1.5 weight percent units derived from one or more chain transfer agents, and has a Tg of from 40° C. to 110° C.

In an alternative embodiment, the instant invention further provides a film comprising one or more embodiments of the multi-stage polymer composition.

The crosslinked core comprises greater than 95 to 99.9 weight percent of units derived from one or more monomers selected from the group consisting of alkyl(meth)acrylate monomers. All individual values and subranges from 95 to 99.9 weight percent are included herein and disclosed herein; for example, the amount of units derived from one or more alkyl(meth)acrylate monomers can be from a lower limit of 95, 95.5, 96, 96.5, 97, 975, 98, 98.5, 99, or 99.5 weight percent to an upper limit of 95.3, 95.8, 96.3, 96.9, 97.5, 98, 98.7, 99.4 or 99.9 weight percent. For example, the amount of units derived from one or more alkyl(meth) acrylate monomers may be in the range of from 95 to 99.9 weight percent, or in the alternative, the amount of units derived from one or more alkyl(meth)acrylate monomers may be in the range of from 95 to 97.5 weight percent, or in the alternative, amount of units derived from one or more alkyl(meth)acrylate monomers may be in the range of from 97.8 to 99.9 weight percent, or in the alternative, the amount of units derived from one or more alkyl(meth)acrylate monomers may be in the range of from 96.5 to 97.9 weight percent.

The crosslinked core comprises from 0.1 to 5 weight percent of units derived from a cross-linking monomer, graft-linking monomer, or combination thereof. All individual values and subranges from 0.1 to 5 weight percent are included herein and disclosed herein; for example, the amount of units derived from cross-linking monomer, graft-linking monomer, or combination thereof can be from a lower limit of 0.1, 0.7, 1.2, 1.9, 2.6, 3.1, 3.7, 4.4, or 4.9 weight percent, to an upper limit of 0.2, 0.8, 1.4, 2.1, 2.7, 3.3, 3.8, 4.5 or 5 weight percent. For example, the amount of units derived from cross-linking monomer, graft-linking monomer, or combination thereof may be in the range of from 0.1 to 5 weight percent, or in the alternative, the amount of units derived from cross-linking monomer, graft-linking monomer, or combination thereof may be in the range of from 0.5 to 2.5 weight percent, or in the alternative, the amount of units derived from cross-linking monomer, graft-linking monomer, or combination thereof may be in the range of from 1.0 to 4.0 weight percent, or in the alternative, the amount of units derived from cross-linking monomer, graft-linking monomer, or combination thereof may be in the range of from 0.3 to 3.5 weight percent.

The crosslinked core has a Tg of from −85 to −10° C. All individual values and subranges from −70 to −10° C. are included herein and disclosed herein; for example, the Tg of the crosslinked core can be from a lower limit of −85, −80 −70, −60, −50, −40, −30, −20, or −15° C. to an upper limit of −75, −65, −55, −45, −35, −25, −17 or −10° C. For example, the Tg of the crosslinked core may be in the range of from −85 to −10° C., or in the alternative, the Tg of the crosslinked core may be in the range of from −60 to −40° C., or in the alternative, the Tg of the crosslinked core may be in the range of from −70 to −50° C., or in the alternative, the Tg of the crosslinked core may be in the range of from −50 to −30° C.

The intermediate region comprises one or more intermediate layers. All individual values and subranges from one or more intermediate layers is disclosed herein and included herein. For example, the intermediate region may comprise one, two, three, four, or five intermediate layers.

Each of the intermediate layers comprises up to 100 weight percent of units derived from a one or more monomers selected from the group consisting of alkyl(meth) acrylate monomers. All individual values and subranges up to 100 weight percent are included herein and disclosed herein; for example, the amount of units derived from one or more alkyl(meth)acrylate monomers can be from a lower limit of 88.5, 89.4, 90.7, 91.8, 92.6, 93.7, 94, 94.9, 95.5, 96, 97.4, 98.1, 99.3, 99.9 or 100 weight percent. For example, the amount of units derived from one or more alkyl(meth) acrylate monomers may be in the range of from 88.5 to 100 weight percent, or in the alternative, the amount of units derived from one or more alkyl(meth)acrylate monomers may be in the range of from 90.5 to 99.9 weight percent, or in the alternative, the amount of units derived from one or more alkyl(meth)acrylate monomers may be in the range of from 88.5 to 94.9 weight percent, or in the alternative, the amount of units derived from one or more alkyl(meth) acrylate monomers may be in the range of from 92.5 to 96 weight percent.

Each of the intermediate layers comprises from 0 to 5 weight percent of units derived from a cross-linking monomer, a graft-linking monomer, or a combination of two or more thereof. All individual values and subranges are disclosed herein and included herein; for example, the amount of units derived from a cross-linking monomer, a graft-linking monomer, or a combination thereof may be from a lower limit of 0, 0.5, 1, 1.5, 2, 2.5, 3, 3.5, 4, or 4.5 weight percent to an upper limit of 0.2, 0.7, 1.2, 1.7, 2.5, 2.7, 3.2, 3.7, 4.2, 4.7, or 5 weight percent. For example, the amount of units derived from a cross-linking monomer, a graft-linking monomer, or a combination of two or more thereof may be in the range of from 0 to 5 weight percent, or in the alternative, the amount of units derived from a cross-linking monomer, a graft-linking monomer, or a combination of two or more thereof may be in the range of from 0 to 2.5 weight percent, or in the alternative, the amount of units derived from a cross-linking monomer, a graft-linking monomer, or a combination of two or more thereof may be in the range of from 2.5 to 5 weight percent, or in the alternative, the amount of units derived from a cross-linking monomer, a graft-linking monomer, or a combination of two or more thereof may be in the range of from 2 to 4 weight percent.

Each of the intermediate layers optionally comprises from 0 to 2.0 weight percent units derived from one or more chain transfer agents. All individual values and subranges from 0 to 2.0 weight percent are included herein and disclosed herein; for example, the amount of units derived from one or more chain transfer agents can be from a lower limit of 0, 0.2, 0.4, 0.6, 0.8, 1.0, 1.2, 1.4, 1.6, 1.8 or 2.0 weight percent to an upper limit of 0.1, 0.3, 0.5, 0.7, 0.9, 1.1, 1.3, 1.7 or 1.9 weight percent. For example, the amount of units derived from one or more chain transfer agents may be in the range of from 0 to 2.0 weight percent, or in the alternative, the amount of units derived from one or more chain transfer agents may be in the range of from 0.75 to 2.0 weight percent, or in the alternative, the amount of units derived from one or more chain transfer agents may be in the range of from 0 to 0.75 weight percent, or in the alternative, the amount of units derived from one or more chain transfer agents may be in the range of from 0.5 to 1.0 weight percent.

There is a compositional gradient between the intermediate layers such that the Tg transitions from −30° C. to 70° C. over the width of the intermediate region. All individual values and subranges from −30° C. to 70° C. are included herein and disclosed herein; for example, the Tg can transition from a lower limit of −30, −20, −10, 0, 10, 20, 30, 40, 50, or 60° C. to an upper limit of −25, −15, −5, 5, 15, 45, or 70° C. For example, the Tg can transition over the range of from −30 to 70° C., or in the alternative, the Tg can transition over the range of from −10 to 30° C., or in the alternative, the Tg can transition over the range of from −30 to −15° C., or in the alternative, or in the alternative, the Tg can transition over the range of from −25 to 0° C., or in the alternative, the Tg can transition over the range of from 0 to 15° C., or in the alternative, the Tg can transition over the range of from −15 to 55° C., or in the alternative, the Tg can transition over the range of from 5 to 35° C.

Without being bound by any particular theory, it is believed that the compositional gradient is achieved by the proper selection of and manner and timing of addition of monomers during the emulsion polymerization process used to prepare the intermediate region. Specifically, a multi-stage polymerization process is used during which monomers are added in stages, rather than all at once, to the emulsion polymerization reactor (or reactor vessel), permitting an interpenetration of one layer into adjacent layers resulting in a Tg gradient over the intermediate stage. Such interpenetration as illustrated as per Inventive Example 1 in FIG. 1.

The outermost layer comprises from 98.5 to 100 weight percent units derived from one or more monomers selected from the group consisting of alkyl(meth)acrylate, styrenic monomers, and combinations of two or more thereof. All individual values and subranges from 98.5 to 100 weight percent are included herein and disclosed herein; for example, the amount of units derived from one or more monomers selected from the group consisting of alkyl(meth) acrylate, styrenic monomers, and combinations of two or more thereof can be from a lower limit of 98.5, 98.7, 98.9, 99.1, 99.3, 99.5, 99.7, or 99.9 weight percent to an upper limit of 98.6, 98.8, 99, 99.2, 99.4, 99.6, 99.8 or 100 weight percent. For example, the amount of units derived from one or more monomers selected from the group consisting of alkyl(meth)acrylate, styrenic monomers, and combinations of two or more thereof may be in the range of from 98.5 to 100 weight percent, or in the alternative, the amount of units derived from one or more monomers selected from the group consisting of alkyl (meth)acrylate, styrenic monomers, and combinations of two or more thereof may be in the range of from 98.5 to 100 weight percent, or in the alternative, the amount of units derived from one or more monomers selected from the group consisting of alkyl(meth) acrylate, styrenic monomers, and combinations of two or more thereof may be in the range of from 98.5 to 100 weight percent, or in the alternative, the amount of units derived from one or more monomers selected from the group consisting of alkyl(meth)acrylate, styrenic monomers, and combinations of two or more thereof may be in the range of from 98.5 to 100 weight percent, or in the alternative, the amount of units derived from one or more monomers selected from the group consisting of alkyl(meth)acrylate, styrenic monomers, and combinations of two or more thereof may be in the range of from 98.5 to 99.6 weight percent, or in the alternative, the amount of units derived from one or more monomers selected from the group consisting of alkyl(meth)acrylate, styrenic monomers, and combinations of two or more thereof may be in the range of from 96.5 to 100 weight percent.

The outermost layer comprises from 0 to 1.5 weight percent units derived from one or more chain transfer agents. All individual values and subranges from 0 to 1.5 weight percent are included herein and disclosed herein; for example, the amount of units derived from one or more chain transfer agents can be from a lower limit of 0, 0.2, 0.4, 0.6, 0.8, 1, 1.2, or 1.4 weight percent to an upper limit of 0.1, 0.3, 0.5, 0.7, 0.9, 1.1, 1.3, or 1.5 weight percent. For example, the amount of units derived from one or more chain transfer agents may be in the range of from 0 to 1.5 weight percent, or in the alternative, the amount of units derived from one or more chain transfer agents may be in the range of from 0 to 0.75 weight percent, or in the alternative, the amount of units derived from one or more chain transfer agents may be in the range of from 0.75 to 1.5 weight percent, or in the alternative, the amount of units derived from one or more chain transfer agents may be in the range of from 0.3 to 1.2 weight percent.

The outermost layer has a Tg of from 40° C. to 110° C. All individual values and subranges from 50° C. to 110° C. are included herein and disclosed herein; for example, the Tg of the outermost layer can be from a lower limit of 40, 43, 45, 50, 60, 70, 80, 90, or 100° C. to an upper limit of 55, 65, 75, 85, 95, 105, or 110° C. For example, the Tg of the outermost layer may be in the range of from 40° C. to 110° C., or in the alternative, the Tg of the outermost layer may be in the range of from 45° C. to 80° C., or in the alternative, the Tg of the outermost layer may be in the range of from 75° C. to 110° C., or in the alternative, the Tg of the outermost layer may be in the range of from 65° C. to 95° C.

"$T_g$" as used herein, is the glass transition temperature, of a copolymer calculated with the Fox equation [*Bulletin of the American Physical Society* 1, 3 Page 123 (1956)] as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, based on weight of monomers charged to the reaction vessel, and $T_{g(1)}$ and $T_{g(2)}$ refer to the glass transition temperatures of the two corresponding homopolymers in degrees Kelvin. For polymers containing three or more monomers, additional terms are added ($w_n/T_{g(n)}$). The glass transition temperatures of homopolymers for the purposes of this invention are those reported in "Polymer Handbook", edited by J. Brandrup and E. H. Immergut, Interscience Publishers, 1966, unless that publication does not report the Tg of a particular homopolymer, in which case the Tg of the homopolymer is measured by differential scanning colorimetry (DSC).

Weight average molecular weight (Mw) is determined by size exclusion chromatography using EasiCal PS-2® polystyrene standards supplied by Polymer Laboratories.

The alkyl(meth)acrylate monomers useful in the crosslinked core, intermediate layers, and outermost layer include linear and branched alkyl(meth)acrylates wherein the alkyl group has from 1 to 12 carbon atoms. Exemplary useful alkyl groups include butyl acrylate, ethyl hexyl acrylate, ethyl acrylate, methyl methacrylate, butyl methacrylate, and iso-octylacrylate.

In an alternative embodiment, the instant invention provides a multi-stage polymer composition and films made therefrom, in accordance with any of the preceding embodiments, except that the alkyl(meth)acrylate monomers of the crosslinked core are selected from the group consisting of butyl acrylate, ethyl hexyl acrylate, ethyl acrylate, methyl methacrylate, and combinations of two or more thereof.

In an alternative embodiment, the instant invention provides a multi-stage polymer composition and films made therefrom, in accordance with any of the preceding embodiments, except that the alkyl(meth)acrylate monomers used in one or more intermediate layers are selected from the group consisting of butyl acrylate, ethyl hexyl acrylate, ethyl acrylate, methyl methacrylate, cyclohexyl methacrylate, cyclopentyl acrylate, benzyl acrylate, benzyl methacrylate and combinations of two or more thereof.

In an alternative embodiment, the instant invention provides a multi-stage polymer composition and films made therefrom, in accordance with any of the preceding embodiments, except that the alkyl(meth)acrylate of the outermost layer is selected from the group consisting of C1-C8 (meth) acrylates, and combinations of two or more thereof.

In an alternative embodiment, the instant invention provides a multi-stage polymer composition and films made therefrom, in accordance with any of the preceding embodiments, except that styrenic monomers are used in the intermediate and/or outermost layers.

In an alternative embodiment, the instant invention provides a multi-stage polymer composition and films made therefrom, in accordance with any of the preceding embodiments, except that the styrenic monomers used in the outermost layer are selected from the group consisting of styrene, α-methylstyrene, vinyl toluene, and combinations of two or more thereof.

In an alternative embodiment, the instant invention provides a multi-stage polymer composition and films made therefrom, in accordance with any of the preceding embodiments, except that the styrenic monomers used in one or more intermediate layers are selected from the group consisting of styrene, α-methylstyrene, vinyl toluene, and combinations of two or more thereof.

Cross-linking and/or graft-linking monomers useful in the crosslinked core and intermediate layers include, for example, butanediol di(meth)acrylate, ethylene glycol di(meth)acrylate, divinyl benzene, diethylene glycol di(meth)acrylate, diallyl maleate, allyl methacrylate, diallyl phthalate, triallyl phthalate, trimethylolpropane tri(meth)acrylate, blends thereof and combinations of two or more thereof.

In an alternative embodiment, the instant invention provides a multi-stage polymer composition and films made therefrom, in accordance with any of the preceding embodiments, except that the cross-linking monomer of the cross-linked core is butanediol diacrylate.

In an alternative embodiment, the instant invention provides a multi-stage polymer composition and films made therefrom, in accordance with any of the preceding embodiments, except that the graft-linking monomer of the cross-linked core is allyl methacrylate.

In an alternative embodiment, the instant invention provides a multi-stage polymer composition and films made therefrom, in accordance with any of the preceding embodiments, except that the graft-linking monomer of the intermediate layer(s) is allyl methacrylate.

In an alternative embodiment, the instant invention provides a multi-stage polymer composition and films made therefrom, in accordance with any of the preceding embodiments, except that the crosslinked core comprises greater than 95 weight percent units derived from a combination of butyl acrylate and butylene glycol diacrylate monomers and from 0.1 to 5 weight percent units derived from allyl methacrylate monomer.

In an alternative embodiment, the instant invention provides a multi-stage polymer composition and films made therefrom, in accordance with any of the preceding embodiments, except that the one or more intermediate layers each comprise units derived from butyl acrylate and methyl methacrylate monomers.

In an alternative embodiment, the instant invention provides a multi-stage polymer composition and films made therefrom, in accordance with any of the preceding embodiments, except that the outermost layer comprises greater than 95 weight percent units derived from a combination of butyl acrylate and methyl methacrylate monomers.

In an alternative embodiment, the instant invention provides a multi-stage polymer composition, in accordance with any of the preceding embodiments, except that the core component and adjacent intermediate layer(s) component are formed by emulsion polymerization and form latex particles having a size less than 250 nm.

"Particle size," as used herein means weight average particle size of the emulsion (co)polymer particles as measured using a Brookhaven BI-90 Particle Sizer. The particle size of the emulsion polymers used to form films of this invention may range from 30 to 250 nanometers. All individual values and subranges from 30 to 250 nm are disclosed herein and included herein; for example, the average particle size may be from a lower limit of 30, 50, 70, 90, 110, 130, 150, 170, 190, 210, or 230 nm to an upper limit of 30, 60, 80, 100, 120, 140, 160, 180, 200, 220, 240 or 250 nm. For example, the weight average particle size of the emulsion (co)polymer particles may range from 50 to 200 nanometers, or in the alternative, from 60 to 175, or in the alternative, from 90 to 175 nanometers.

In an alternative embodiment, the instant invention provides a multi-stage polymer composition and films made therefrom, in accordance with any of the preceding embodiments, except that the weight average molecular weight (Mw) of the outermost layer composition is less than 100,000 g/mole All individual values and subranges of less than 100,000 g/mole are included herein and disclosed herein; for example, the molecular weight (Mw) of the outermost layer can be from an upper limit of 100,000; 80,000; 60,000; 40,000, 20,000; or 10,000 g/mole. For example, the molecular weight (Mw) of the outermost layer may be in the range of from 20,000 to 100,000 g/mole, or in the alternative, the molecular weight (Mw) of the outermost layer may be in the range of from 40,000 to 80,000 g/mole, or in the alternative, the molecular weight (Mw) of the outermost layer may be in the range of from 40,000 to 60,000 g/mole, or in the alternative, the molecular weight (Mw) of the outermost layer may be in the range of from 40,000 to 50,000 g/mole, or in the alternative, the molecular weight (Mw) of the outermost layer may be in the range of from 20,000 to 30,000 g/mole.

In an alternative embodiment, the instant invention provides a multi-stage polymer composition and films made therefrom, in accordance with any of the preceding embodiments, except that the film exhibits one or more of the following properties: a modulus of 30,000 psi or less; and an elongation at break of at least 200%. All individual values and subranges from a modulus of 30,000 psi or less are included herein and disclosed herein; for example, the modulus can be from an upper limit of 30,000; 25,000, 20,000; 19,000; 18,000; or 17,000 psi. For example, the film modulus may be in the range of from 18,000 to 30,000 psi, or in the alternative, the film modulus may be in the range of from 25,000 to 30,000 psi, or in the alternative, the film modulus may be in the range of from 19,500 to 20,000 psi. All individual values and subranges from a elongation at break of at least 200% are included herein and disclosed herein; for example, the elongation at break can be from a lower limit of 200%, 190%, 180%, or 170%. In one embodiment the elongation at break of the film has a lower limit of 150%.

In an alternative embodiment, the instant invention provides a multi-stage polymer composition and films made therefrom, in accordance with any of the preceding embodiments, except that the film having a thickness of 300 μm or less exhibits one or more of the following properties: a haze of less than 1.5%; a yellowness index of less than 1%. All individual values and subranges of a haze of less than 1% are included herein and disclosed herein; for example, the haze can be from an upper limit of 1%, 0.9%, or 0.8%. In one embodiment, the haze of the film has a lower limit of 0.5%. All individual values and subranges of a yellowness index of less than 1% are included herein and disclosed herein; for example, the yellowness index can be from an upper limit of 1%, 0.9%, or 0.8%. In one embodiment, the yellowness index of the film has a lower limit of 0.5%.

In an alternative embodiment of the invention, the multi-stage polymer composition according to any one of the foregoing embodiments may be formed into sheets. End use applications for such sheets include, but are not limited to, glass laminates and interlayers for use in automotive windows and windshields, and for use in hurricane resistant glass windows and/or doors. Sheets made from the inventive polymer compositions may have any appropriate thickness. In one embodiment, the sheet is between 150 and 500 microns.

In an alternative embodiment, the instant invention provides a multi-stage polymer composition and films made therefrom, in accordance with any of the preceding embodiments, except that the film further comprises one or more additives selected from the group consisting of stabilizers, and plasticizers.

Multi-stage polymer composition and films made therefrom can also contain other ingredients that include, but are not limited to, dyes, pigments, flameproofing agents, internal and external lubricants, slip aids, impact modifiers, processing aids, blowing agents, fillers and with other additives to prevent, reduce or mask discoloration or deterioration caused by heating, aging, exposure to light or weathering.

The multi-stage polymer composition can be processed into film and/or sheet by way of extrusion, calendaring, or injection molding.

In yet another embodiment, the invention provides a multi-stage polymer composition consisting essentially of: a crosslinked core which comprises greater than 95 weight percent of units derived from one or more monomers selected from the group consisting of alkyl(meth)acrylate monomers, from 0.1 to 5 weight percent of units derived from a cross-linking monomer, graft-linking monomer, or combination thereof, and wherein the crosslinked core has a Tg of from −85 to −10° C.; an intermediate region which comprises one or more intermediate layers, wherein each of the intermediate layers comprises from 88.5 to 100 weight percent of units derived from a one or more monomers selected from the group consisting of alkyl(meth)acrylate monomers, from 0 to 5 weight percent of units derived from a cross-linking monomer, a graft-linking monomer, or a combination of two or more thereof, optionally from 0 to 2.0 weight percent units derived from one or more chain transfer agents; wherein there is a compositional gradient between the intermediate layers such that the Tg transitions from −30° C. to 70° C. over the width of the intermediate region, and an outermost layer which comprises from 98.5 to 100 weight percent units derived from one or more monomers selected from the group consisting of alkyl(meth)acrylate, styrenic monomers, and combinations of two or more thereof, from 0 to 1.5 weight percent units derived from one or more chain transfer agents, and has a Tg of from 40° C. to 110° C.

In yet another embodiment, the invention provides a multi-stage polymer composition comprising: a crosslinked core which consists essentially of greater than 95 weight percent of units derived from one or more monomers selected from the group consisting of alkyl(meth)acrylate monomers, from 0.1 to 5 weight percent of units derived from a cross-linking monomer, graft-linking monomer, or combination thereof, and wherein the crosslinked core has a Tg of from −85 to −10° C.; an intermediate region which comprises one or more intermediate layers, wherein each of the intermediate layers comprises from 88.5 to 100 weight percent of units derived from a one or more monomers selected from the group consisting of alkyl(meth)acrylate monomers, from 0 to 5 weight percent of units derived from a cross-linking monomer, a graft-linking monomer, or a combination of two or more thereof, optionally from 0 to 2.0 weight percent units derived from one or more chain transfer agents; wherein there is a compositional gradient between the intermediate layers such that the Tg transitions from −30° C. to 70° C. over the width of the intermediate region, and an outermost layer which comprises from 98.5 to 100 weight percent units derived from one or more monomers selected from the group consisting of alkyl(meth)acrylate, styrenic monomers, and combinations of two or more thereof, from 0 to 1.5 weight percent units derived from one or more chain transfer agents, and has a Tg of from 40° C. to 110° C.

In yet another embodiment, the invention provides a multi-stage polymer composition comprising: a crosslinked core which comprises greater than 95 weight percent of units derived from one or more monomers selected from the group consisting of alkyl(meth)acrylate monomers, from 0.1 to 5 weight percent of units derived from a cross-linking monomer, graft-linking monomer, or combination thereof, and wherein the crosslinked core has a Tg of from −85 to −10° C.; an intermediate region which comprises one or more intermediate layers, wherein each of the intermediate layers consists essentially of from 88.5 to 100 weight percent of units derived from a one or more monomers selected from the group consisting of alkyl(meth)acrylate monomers, from 0 to 5 weight percent of units derived from a cross-linking monomer, a graft-linking monomer, or a combination of two or more thereof, optionally from 0 to 2.0 weight percent units derived from one or more chain transfer agents; wherein there is a compositional gradient between the intermediate layers such that the Tg transitions from −30° C. to 70° C. over the width of the intermediate region, and an outermost layer which comprises from 98.5 to 100 weight percent units derived from one or more monomers selected from the group consisting of alkyl(meth)acrylate, styrenic monomers, and combinations of two or more thereof, from 0 to 1.5 weight percent units derived from one or more chain transfer agents, and has a Tg of from 40° C. to 110° C.

In yet another embodiment, the invention provides a multi-stage polymer composition comprising: a crosslinked core which comprises greater than 95 weight percent of units derived from one or more monomers selected from the group consisting of alkyl(meth)acrylate monomers, from 0.1 to 5 weight percent of units derived from a cross-linking monomer, graft-linking monomer, or combination thereof, and wherein the crosslinked core has a Tg of from −85 to −10° C.; an intermediate region which comprises one or more intermediate layers, wherein each of the intermediate layers comprises from 88.5 to 100 weight percent of units derived from a one or more monomers selected from the group consisting of alkyl(meth)acrylate monomers, from 0 to 5 weight percent of units derived from a cross-linking monomer, a graft-linking monomer, or a combination of two or more thereof, optionally from 0 to 2.0 weight percent units derived from one or more chain transfer agents; wherein there is a compositional gradient between the intermediate layers such that the Tg transitions from −30° C. to 70° C. over the width of the intermediate region, and an outermost layer which consists essentially of from 98.5 to 100 weight percent units derived from one or more monomers selected from the group consisting of alkyl(meth)acrylate, styrenic monomers, and combinations of two or more thereof, from 0 to 1.5 weight percent units derived from one or more chain transfer agents, and has a Tg of from 40° C. to 110° C.

In yet an alternative embodiment, the invention provides a sheet or film consisting essentially of one or more of the multi-stage polymer composition according to any of the foregoing embodiments.

EXAMPLES

The following examples illustrate the present invention but are not intended to limit the scope of the invention.

Inventive Example 1

The components used in preparing Inventive Example 1 are shown in Table 1.

A reactor equipped with a stirrer and condenser and blanked with nitrogen was charged with Mixture A. Into the stirred reactor at 85° C. were added Mixture B, 7% of Mixture C, 1.7% of Mixture D and 10.4% of Mixture E. After an exothermic reaction took place and the reactor reached peak temperature, the heating and stirring were continued at 85° C. for 5 minutes. The remainder of Mixture C and 8.7% of Mixture D were gradually added to the reactor over 90 minutes. After the addition was complete, the reactor was kept at 85° C. for 15 minutes. 24.3% of Mixture E was added to the reactor. Mixture F and 24.3% of Mixture D were gradually added to the reactor over 90 minutes. After the addition was complete, the reactor was held at 85° C. for 15 minutes. 21.9% of Mixture E was added to the reactor. Mixture G and 21.9% of Mixture D were gradually added to the reactor over 60 minutes. After the addition was complete, the reactor was held at 85° C. for 15 minutes. The remainder of Mixture E was added to the reactor. Mixture H and the remainder of Mixture D were gradually added to the reactor over 60 minutes. After the addition was complete, the reactor was held at 85° C. for 15 minutes, then cooled to ambient temperature.

TABLE 1

| Mixture | Component | Parts by Weight |
|---|---|---|
| A | Water | 385 |
|  | 23% Aqueous sodium dodecylbenzenesulfonate | 2.5 |
| B | 0.2% Aqueous iron sulfate heptahydrate | 1.21 |
|  | 0.5% Aqueous ethylenediaminetetracetic acid | 1.02 |
|  | Water | 5 |
| C | Butyl acrylate | 124.4 |
|  | 1,3-Butanediol diacrylate | 1.26 |
|  | Allyl methacrylate | 0.63 |
|  | 23% Aqueous sodium dodecylbenzenesulfonate | 3.9 |
|  | Water | 35 |
| D | 70% aqueous tert-butylhydroperoxide | 0.38 |
|  | Water | 14.8 |
| E | Sodium hydroxymethanesulfinate hydrate | 0.47 |
|  | Water | 23.8 |
| F | Butyl acrylate | 80.9 |
|  | Methyl methacrylate | 43.6 |
|  | Allyl methacrylate | 0.63 |
|  | 23% Aqueous sodium dodecylbenzenesulfonate | 3.8 |
|  | Water | 35 |
| G | Butyl acrylate | 13.7 |
|  | Methyl methacrylate | 39.6 |
|  | 1-dodecanethiol | 0.22 |
|  | 23% Aqueous sodium dodecylbenzenesulfonate | 2.3 |
|  | Water | 13.5 |
| H | Butyl acrylate | 13.7 |
|  | Methyl methacrylate | 39.6 |
|  | 1-dodecanethiol | 0.92 |
|  | 23% Aqueous sodium dodecylbenzenesulfonate | 2.3 |
|  | Water | 13.5 |

Inventive Example 1 had an average particle size of 164 nm, a solids content of 39.3%, and a weight average molecular weight of 42,400 g/mol.

Comparative Example 1

Table 2 shows the components used in preparing Comparative Example 1. Comparative Example 1 is prepared by a 4-stage acrylic aqueous emulsion polymerization:

A reactor equipped with a stirrer and condenser and blanked with nitrogen was charged with Mixture A. Into the stirred reactor at 83° C. were added 7% of Mixture B, 1.8% of Mixture D and 11.3% of Mixture E. After an exothermic reaction took place and the reactor reached peak temperature, the heating and stirring were continued at 85° C. for 5 minutes. The remainder of Mixture B, Mixture C and 8.7% of Mixture D were gradually added to the reactor over 90 minutes. After the addition was complete, the reactor was kept at 85° C. for 15 minutes. 38.9% of Mixture E was added to the reactor. Mixture F and 9.4% of Mixture D were gradually added to the reactor over 90 minutes. After the addition was complete, the reactor was held at 85° C. for 15 minutes. 16.8% of Mixture E was added to the reactor. Mixture G and 21.5% of Mixture D were gradually added to the reactor over 60 minutes. After the addition was complete, the reactor was held at 85° C. for 15 minutes. The remainder of Mixture E was added to the reactor. Mixture H and the remainder of Mixture D were gradually added to the reactor over 60 minutes. After the addition was complete, the reactor was held at 85° C. for 15 minutes, then cooled to ambient temperature.

TABLE 2

| Mixture | Component | Parts by Weight |
|---|---|---|
| A | Deionized Water | 387.5 |
|  | 23% Aqueous sodium dodecylbenzenesulfonate | 2.6 |
| B | Butyl acrylate | 124.4 |
|  | 1,3-Butanediol diacrylate | 1.26 |
|  | Allyl methacrylate | 0.63 |
|  | 23% Aqueous sodium dodecylbenzenesulfonate | 2.9 |
|  | Water | 35 |
| C | 23% Aqueous sodium dodecylbenzenesulfonate | 2.82 |
|  | Water | 3.75 |
| D | 70% aqueous tert-butylhydroperoxide | 0.35 |
|  | Water | 12.3 |
| E | Sodium hydroxymethanesulfinate hydrate | 0.43 |
|  | Water | 16.3 |
| F | Butyl acrylate | 49.8 |
|  | Methyl methacrylate | 74.7 |
|  | Allyl methacrylate | 0.63 |
|  | 23% Aqueous sodium dodecylbenzenesulfonate | 5.45 |
|  | Water | 35 |
| G | Butyl acrylate | 13.7 |
|  | Methyl methacrylate | 39.6 |
|  | 1-dodecanethiol | 0.22 |
|  | 23% Aqueous sodium dodecylbenzenesulfonate | 2.3 |
|  | Water | 13.5 |
| H | Butyl acrylate | 13.7 |
|  | Methyl methacrylate | 39.6 |
|  | 1-dodecanethiol | 0.92 |
|  | 23% Aqueous sodium dodecylbenzenesulfonate | 2.3 |
|  | Water | 13.5 |

Comparative Example 1 had a particle size of 219 nm, a solids content of 38.9% and a weight average molecular weight of 29,300 g/mole.

As can be seen in FIG. 1, Inventive Example 1 exhibits less distinct heat capacity peaks for the intermediate stage of the polymer composition, indicating a compositional gradient, rather than distinct intermediate layers.

The emulsion prepared from each of Inventive Example 1 and Comparative Example 1 above was freeze dried with a vacuum oven, and the resultant powder was then processed using a Collin Mill (W. H. Collin GmbH Maschienefabrik, Aichach, Germany) at 160° C. for 3 minutes. After the milling was completed, the molten polymer was peeled from the metal rolls and cooled down to provide film with a thickness in the range from 190 to 250 μm.

TABLE 3

| Units | Film thickness (microns) | Elongation@break (%) | stress@ yield (psi) | stress@break (psi) | Modulus (psi) | Stress whitening |
|---|---|---|---|---|---|---|
| Comparative Example 1 | 205 | 297 | 2650 | 2910 | 46200 | Yes |
| Inventive Example 1 | 190 | 321 | 679 | 1628 | 12160 | No |

TABLE 4

| | Haze (%) | Y Total (%) | L | a | b | YI |
|---|---|---|---|---|---|---|
| Comparative Example 1 | 2.67 | 92.6 | 96.7 | −0.384 | 1.428 | 2.35 |
| Inventive Example 1 | 0.89 | 93.3 | 97.0 | −0.066 | 0.508 | 0.89 |

Test Methods

GPC Molecular Weight

The term "molecular weight" as used herein refers to peak average molecular weight as determined by gel permeation chromatography (GPC) against narrow molecular weight polystyrene standards in tetrahydrofuran solvent at 25° C. using Polymer Laboratories data manipulation software.

Particle Size

The volume average particle size was measured on very dilute latexes (diluted to 0.001% solids) with a BI 90 (Brookhaven Instruments, Holtsville, N.Y.) particle size detector, utilizing Dynamic Light Scattering (15° and 90° scattering angles) and a laser light source. The signal is detected by a photodiode array and the data analyzed with a built in correlator.

Differential Scanning Calorimetry (DSC)

The glass transition temperature (Tg) was measured using a differential scanning calorimetry (DSC) from TA Instruments (New Castle, Del., USA). Samples were tested in an aluminum pan under $N_2$ under a rate of 20° C./min.

Haze Level

Haze level of films was measured in accordance with ASTM 871-96(2010).

Film Thickness

The thickness of the films was measured using a micrometer.

Optical Properties

Optical properties were measured using a Color Quest II, from Hunter Labs. (Reston, Va., USA).

The present invention may be embodied in other forms without departing from the spirit and the essential attributes thereof, and, accordingly, reference should be made to the appended claims, rather than to the foregoing specification, as indicating the scope of the invention.

We claim:

1. A multi-stage polymer composition comprising:
a crosslinked core which comprises greater than 95 weight percent of units derived from one or more monomers selected from the group consisting of alkyl (meth)acrylate monomers, from 0.1 to 5 weight percent of units derived from a cross-linking monomer, graft-linking monomer, or combination thereof, and wherein the crosslinked core has a Tg of from −85 to −10° C.;
an intermediate region which comprises one or more intermediate layers, wherein each of the intermediate layers comprises from 88.5 to 100 weight percent of units derived from a one or more monomers selected from the group consisting of alkyl (meth)acrylate monomers, from 0 to 5 weight percent of units derived from a cross-linking monomer, a graft-linking monomer, or a combination of two or more thereof, optionally from 0 to 2.0 weight percent units derived from one or more chain transfer agents; wherein there is a compositional gradient between the intermediate layers such that the compositional gradient transitions between a lower Tg and an upper Tg, wherein said lower Tg is at least 0° C. and said upper Tg is 70° C. or less over the width of the intermediate region, and
an outermost layer which comprises from 98.5 to 100 weight percent units derived from one or more monomers selected from the group consisting of alkyl (meth) acrylate, styrenic monomers, and combinations of two or more thereof, from 0 to 1.5 weight percent units derived from one or more chain transfer agents, and has a Tg of from 40° C. to 110° C.

2. The multi-stage polymer composition according to claim 1, wherein the outermost layer has a Tg of from 50° C. to 97° C.

3. The multi-stage polymer composition according to claim 1, wherein the crosslinked core has a Tg of from −55 to −30 C.

4. The multi-stage polymer composition according to claim 1, wherein the cross-linking monomer of the crosslinked core, the graft-linking monomer of the crosslinked core, the cross-linking monomer of the intermediate layer(s) and the graft-linking monomer of the intermediate layer(s) are selected from the group consisting of butanediol di(meth)acrylate, ethylene glycol di(meth)acrylate, divinyl benzene, diethylene glycol di(meth)acrylate, trimethyolpropane triacrylate, butylene glycol dimethacrylate, blends thereof, and combinations of two or more thereof.

5. The multi-stage polymer composition according to claim 1, wherein the cross-linking monomer of the crosslinked core and the cross-linking monomer of the intermediate layer(s) are selected from the group consisting allyl methacrylate, diallyl maleate, blends thereof, and combinations of two or more thereof.

6. The multi-stage polymer composition according to claim 1, wherein the cross-linking monomer of the crosslinked core is butanediol diacrylate, the graft-linking monomer of the crosslinked core is allyl methacrylate and the graft-linking monomer of the intermediate layer(s) is allyl methacrylate.

7. The multi-stage polymer composition according to claim 1, wherein the alkyl (meth)acrylate monomers of the crosslinked core are selected from the group consisting of butyl acrylate, ethyl hexyl acrylate, ethyl acrylate, methyl methacrylate, and combinations of two or more thereof.

8. The multi-stage polymer composition according to claim 1, wherein the alkyl (meth)acrylate monomers of the intermediate layer(s) are selected from the group consisting of butyl acrylate, ethyl hexyl acrylate, ethyl acrylate, methyl methacrylate, cyclohexyl (meth)acrylate, cyclopentyl methacrylate, tetrahydrofurfyl methacrylate, benzyl (meth)acryale and combinations of two or more thereof.

9. The multi-stage polymer composition according to claim 1, wherein the alkyl (meth)acrylate monomers of the outermost layer are selected from the group consisting of butyl acrylate, ethyl hexyl acrylate, ethyl acrylate, methyl methacrylate, and combinations of two or more thereof.

10. The multi-stage polymer composition according to claim 1, wherein the crosslinked core comprises at least 95 weight percent units of butyl acrylate and from 0.1 to 5.0 weight percent units of a combination of butylene glycol diacrylate and allyl methacrylate, 95 weight percent units derived from a combination of butyl acrylate and butylene glycol diacrylate monomers and from 0.1 to 5 weight percent units derived from allyl methacrylate.

11. The multi-stage polymer composition according to claim 1, wherein the one or more intermediate layers each comprise units derived from butyl acrylate and methyl methacrylate.

12. The multi-stage polymer composition according to claim 1, wherein the outermost layer comprises greater than 95 weight percent units derived from a combination of butyl acrylate and methyl methacrylate monomers.

13. The multi-stage polymer composition according to claim 1, wherein the weight average ($M_w$) molecular weight of the outermost layer composition is less than 50,000 g/mol.

14. A film or sheet comprising the multi-stage polymer composition according to claim 1.

15. The film or sheet according to claim 14, wherein the film exhibits one or more of the following properties: a modulus of 30,000 psi or less; and an elongation at break of at least 200%.

16. The film or sheet according to claim 14, wherein the film or sheet has a thickness of from 3 mil to 12 mil and exhibits one or more of the following properties: a haze of less than 1%; and a yellowness index of less than 1%.

\* \* \* \* \*